US 6,543,470 B2

(12) United States Patent
Mans

(10) Patent No.: US 6,543,470 B2
(45) Date of Patent: Apr. 8, 2003

(54) FLEXIBLE TRAP FOR DRAINS

(76) Inventor: Daniel Rudolf Mans, 3/164 Prince Regent Drive Bucklands Beach, Auckland (NZ)

(*) Notice: Subject to any disclaimer, the term of this patent is extended or adjusted under 35 U.S.C. 154(b) by 0 days.

(21) Appl. No.: 09/861,659

(22) Filed: May 22, 2001

(65) Prior Publication Data

US 2001/0047823 A1 Dec. 6, 2001

(30) Foreign Application Priority Data

| May 22, 2000 | (NZ) | ................................................ 504646 |
| May 22, 2000 | (NZ) | ................................................ 504647 |

(51) Int. Cl.$^7$ .............................................. E03C 1/288
(52) U.S. Cl. ........................... 137/247.19; 137/297.11; 4/679; 138/104
(58) Field of Search ................. 137/247.19, 247.11, 137/559, 247.49; 4/679; 138/104

(56) References Cited

U.S. PATENT DOCUMENTS

| 175,908 A | * | 4/1876 | Bedell ................ 137/247.19 |
| 244,425 A | * | 7/1881 | Bedell ................ 137/247.19 |
| 1,884,855 A | * | 10/1932 | Pryce ................ 137/247.51 |
| 2,484,031 A | * | 10/1949 | Havrenius .......... 137/247.11 |
| 2,935,992 A | * | 5/1960 | Barker et al. ....... 137/247.11 |
| 3,313,314 A | | 4/1967 | Burke et al. |
| 3,860,978 A | * | 1/1975 | Wirth .................. 4/679 |
| 3,908,208 A | * | 9/1975 | McIlroy ............... 4/679 |
| 3,967,324 A | * | 7/1976 | Olive .................. 4/679 |
| 4,280,334 A | * | 7/1981 | Lakdawala ............ 62/277 |
| 4,301,554 A | * | 11/1981 | Wojcicki .............. 4/679 |
| 4,516,278 A | * | 5/1985 | Lamond ............... 4/679 |
| 4,671,076 A | * | 6/1987 | Duren ................. 62/289 |
| 5,063,616 A | * | 11/1991 | Bresnahan ........... 137/247.49 |
| 5,522,229 A | * | 6/1996 | Stuchlik, III et al. ... 62/127 |

* cited by examiner

Primary Examiner—John Rivell
(74) Attorney, Agent, or Firm—Young & Thompson

(57) ABSTRACT

Traps particularly intended for carrying condensate from air conditioner drip trays towards a drainage system are constructed from a single turn of a flexible thermoplastic pipe; each unit being preformed when in a heat-softened state into a shape of a one-turn coil resembling the twist in a pig's tail, or the Greek "alpha" (α) symbol. Traps are made of a transparent flexible durable thermoplastics material, such as polyvinyl chloride, and internal contents may be inspected through the trap wall. Being flexible, the traps can reliably connect mis-aligned conduits. Being flexible, the traps can serve as reliable connectors between conduits where relative movement is a problem such as where vibration or earthquakes occur.

9 Claims, 1 Drawing Sheet

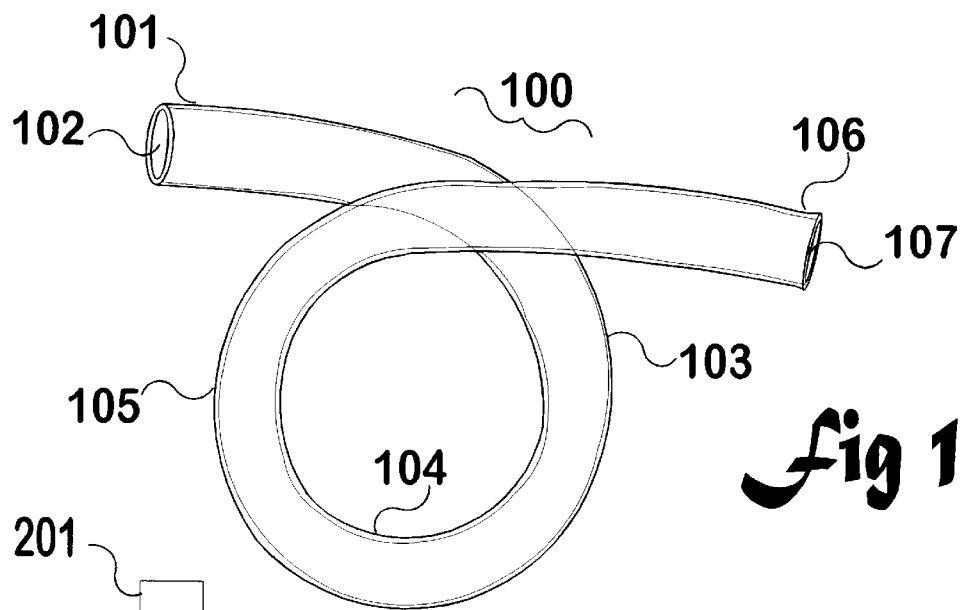
*fig 1*
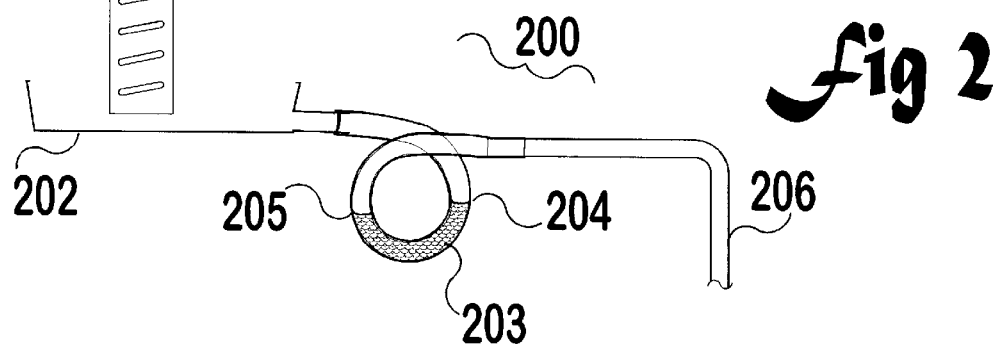
*fig 2*
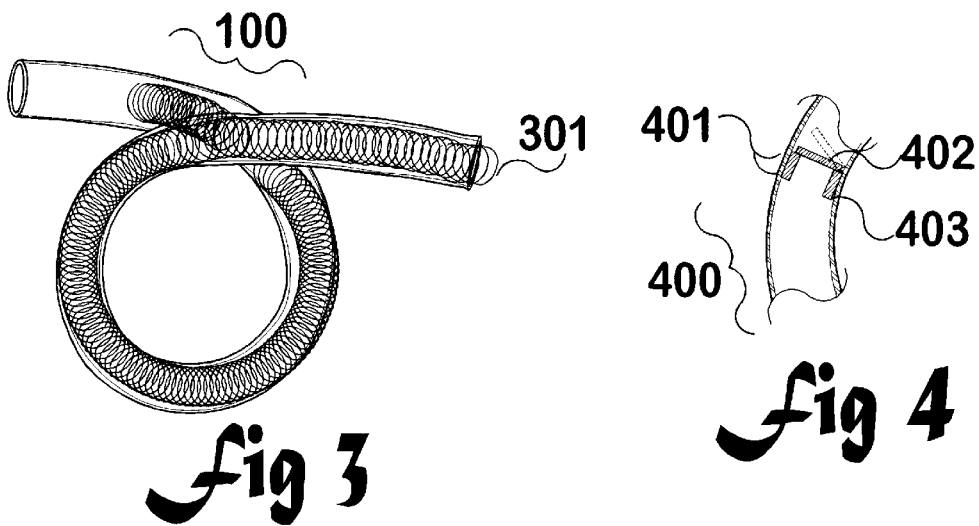
*fig 3*
*fig 4*

FLEXIBLE TRAP FOR DRAINS

FIELD

This invention relates to plumbing, to plumbing traps and plumbing couplers made of flexible pipe, and to plumbing traps having a shape suitable for use in conjunction with drainage of condensate from refrigeration units and in particular with air conditioning units or the like.

BACKGROUND

An air conditioner employs a heat exchanger for exchanging heat with room air which exchanger is generally much colder than the room air when cooling a space during a hot day. As a motor-driven fan draws air through a filter and over the metal fins of the heat exchanger (and then into the space being conditioned) moisture in the air tends to condense and fall down into a drip tray, from where the condensate is led through a pipe into a drain on a continuously connected basis. As is usual in plumbing practice, a trap comprising a "U" shaped bent pipe and containing enough water to fill the base of the "U" is commonly employed to prevent bad smells from the drain from being drawn into the air conditioner by negative pressure developed by the fan, and so into the space being conditioned, where a smell would have a high nuisance value at least.

It is usual to provide some clear tubing at the connection to the tray, in order to demonstrate to a service engineer the presence of water at this point and hence a likely blockage. The remainder of the trap is typically made of rigid plastics or metal pipe. Current types of "U" trap are unduly complex, difficult to maintain because the amount of water within the trap cannot easily be ascertained, and are not adaptable to being fitted into warped positions. There is a requirement that a small negative pressure be sustainable (especially if the inlet filter becomes occluded), so that typical traps resemble siphons although with the first leg entered by condensate being higher than the second leg so that internal water can rise a little more within the first leg.

Within the recent patent literature, few references to air conditioning system condensate traps were found. Chaves (U.S. Pat. No. 5,644,925, July 1997) describes a trap having an internal valve capable of preventing undesired air movement in either direction while allowing water to pass. Jacob (U.S. Pat. No. 3,905,203, September 1975) describes a complex condensate collector including a fine capillary structure, which might be prone to algal contamination.

In relation to traps in general, Lamond (U.S. Pat. No. 4,516,278, May 1985) describes an "P" trap of conventional configuration for use underneath a sink, where the trap is made from a flexible pipe. The stated advantages include that fitting is easier, congealed material may be shifted by external manipulation, and if the pipe is also transparent, the contents of the trap—water and perhaps solid and even wanted objects can be seen. Bresnahan (U.S. Pat. No. 5,063,616, November 1991) describes a similar trap of conventional configuration; a flexible "S" bend trap.

DEFINITIONS

The term "flexible" as used in this specification means that the examples of the trap as will subsequently be described can be bent about by hand pressure at room temperature and otherwise manipulated yet are sturdy enough to not collapse when the interior is subjected to a mild negative pressure of the amount expected in use.

By "thermoplastic" we refer to a plastics material capable of becoming softened at a softening temperature and if distorted by external forces while softened, of holding that distortion in a fixed state when cooled.

OBJECT

It is an object of this invention to provide an improved trap for connection to a drainage system, or at least to provide the public with a useful choice.

STATEMENT OF INVENTION

In a first broad aspect the invention provides a flexible trap or coupling for connection between a conduit (a pipe) capable of delivering a liquid and a conduit (a pipe) capable of disposing of the liquid such as toward a drain, wherein the trap comprises a hollow, elongate (that is, tubular) flexible (as herein defined) member in the form of an open loop having a substantially constant rate of bending and having a configuration resembling the Greek "alpha" ($\alpha$) symbol; the flexible trap having an inlet at a first free end continuous with a first limb, the first limb being continuous with an intermediate part and then a second limb, in turn continuous with an outlet at a second free end; the flexible trap being capable, when used in an orientation wherein the inlet and the outlet are at a similar height and the intermediate part is below the inlet and below the outlet, of retaining a sufficient amount of the liquid within at least the intermediate part to allow operation as a plumbing trap by holding and allowing the passage of the liquid yet being capable of blocking the passage of a gas.

Preferably the flexible material is selected from a range of flexible plastics materials including polyvinyl chloride and the like.

Preferably the flexible plastics material is a thermoplastic, as herein defined.

Preferably the flexible material is effectively transparent so that an amount of liquid held within may be inspected from the exterior.

Preferably the plastics material is substantially transparent so that dirt, algae, blockages, and the like are visible through the walls.

Preferably the flexible material, though effectively transparent, is coloured with an effective amount of a dye capable of absorbing light used by plant life, so that the growth of said plant life is discouraged.

Preferably the flexible material is capable of being installed in a permanently distorted configuration so that connections may be made between misaligned pipes, yet the flexible material will not exhibit long-term cracking.

Optionally, a mechanical one-way valve is included within the flexible trap so that the trap function is retained even if insufficient liquid is present within the trap.

Preferably the flexible material is capable of being used in a permanently distorted configuration so that connections may be made between misaligned pipes.

Preferably the flexible material is sufficiently flexible to permit removal in order to clear internal blockages, but is not so weak that the walls will collapse together during use.

Preferably the flexible material is capable of withstanding vibration applied between one end and the other.

In a second broad aspect the flexible trap as previously described in this section may be considered as a flexible coupling, the slightly altered purpose being for bridging a gap between a first conduit and a second conduit particularly in situations where one conduit is capable of exhibiting motion in relation to the other, wherein both (a) the flexible material comprising the flexible coupling, and (b) the "alpha" (α) configuration which has the effect of distributing the strain over the entire loop serve to maintain the integrity of the coupling despite relative movement.

In a third broad aspect this invention provides a method for the manufacture of preformed traps of a flexible hollow elongated material as previously described in this section, including the steps of: taking a suitable length of pipe, fitting a coil of wire within the pipe, softening the pipe using heat (such as within an oven), placing the pipe in a jig in an over-bent shape to allow for some springing back, optionally returning it to the oven, cooling the pipe while holding it in the jig, and removing the coil of wire by twisting one end so that the coil diameter is reduced and the coil can be withdrawn.

In a related aspect, another method for manufacture includes the steps of: taking a length of pipe, placing a restriction at one end of the pipe, passing a flow of heated air through the pipe from the other end under a slight positive pressure capable of causing distension, and when the pipe is soft and able to be distorted, wrapping it around a former of a suitable diameter and then continuing to pass now cooled gas through the pipe also under a slight distending pressure (capable of preventing loss of patency of the lumen) until the pipe is no longer soft.

Preferably the former has sides also tending to prevent flattening of the softened pipe.

PREFERRED EMBODIMENT

The description of the invention to be provided herein is/are given purely by way of example and are not to be taken in any way as limiting the scope or extent of the invention.

DRAWINGS

FIG. 1: shows a trap of the invention.

FIG. 2: shows how the invention is used as a trap and as a coupler in an air conditioner installation.

FIG. 3: shows a spring within a freshly made trap of the invention, just after being cooled while being distorted into a specified shape.

FIG. 4: shows a valve within a trap of the invention.

In general the examples described within this invention relate to traps for carrying condensate from air conditioner drip trays towards a drainage system, although it must be realised that the same devices can be adapted for use with other plumbing applications currently employing "S" or "P" type traps, and may even be usable as fluid-carrying vibration buffers where parts of an installation move in relation to other parts yet fluids must be carried between them. Indeed, the invention can be regarded in the most general sense as a flexible connector for connecting pipes together; the trap function is an addition to the connecting function.

The examples described herein are one-piece units constructed from a single turn of a pipe; each unit resembling a one-turn coil, or the twist in a pig's tail, or the Greek "alpha" (α) symbol. FIG. 1 shows a trap 100, wherein 101 is a first end having a first aperture 102; 103 is a descending limb of the trap, 104 is a dependent section, 105 is an ascending limb, and 106 is a second end of the trap, having a second aperture 107. Note that the internal diameters of the first and the second apertures may be made different by attaching collars.

The preferred material is a flexible (at room temperature) pipe made of clear polyvinyl chloride, typical prototype example sizes being:

Internal diameter 25 mm, wall thickness 3.5 mm, initial length 500 mm, outer diameter of coil about 125 mm.

Internal diameter 19 mm, wall thickness 3 mm, initial length 400 mm, diameter of coil about 110 mm.

Internal diameter 16 mm, wall thickness 1.5 mm, initial length 400 mm, diameter of coil about 110 mm.

Internal diameter 13 mm, wall thickness 2.5 mm, initial length 350 mm, diameter of coil about 85 mm.

1.5 mm is the preferred wall thickness for a wide range of internal diameters, if available.

The invention may be scaled up or down as appropriate for an installation, and the lengths of the free ends may be varied. In the event of different diameters of pipe existing at the drain and at the condensate tray outlet, the invention may also act as an adaptor by means of size reduction, or size increase collars formed into the invention at one or both ends. For example a 19 mm ID collar may be formed on to a 12 mm ID pipe by gluing an intermediate collar, and then a short length of 19 mm pipe at one end.

MANUFACTURE

Traps according to the invention are formed during manufacture from stock pipe by exploiting the thermoplastic properties of (for example) polyvinylchloride plastic (PVC). PVC starts to soften at from 75 to 90 degrees C., while temperatures high enough to cause decomposition should be avoided. Clear (that is, water-clear) or transparent (that is, clear but coloured) pipe is preferred.

The growth of algae within a trap of this type is a possibility because many installations are exposed to some ambient light from ceiling lighting. Therefore the use of a transparent wall, coloured so as to block light capable of activating chlorophyll or other algal pigments is proposed and effective amounts of yellow, orange, or red dyes (i.e. dyes blocking blue or green light) within the trap walls may be used.

A preferred method of manufacture of prototype traps is to cut a suitable length of pipe, fit a temporary, close-fitting spring 301 within the pipe, soften the pipe using heat (such as within an oven set to about 125 degrees), place the pipe in a jig, and cool the pipe while held in the jig in an over-bent shape to allow for some springing back, and then, after removing the pipe from the jig, remove the spring by twisting one end so that the spring diameter is reduced and it can be withdrawn. Cold water can be used to cool the pipe. The spring serves to maintain patency of the lumen of the trap, in case the walls of the hot tube collapse when bent while soft. Of course, other ways to form a bend in a thermoplastic tube while retaining the internal diameter at substantially a constant value are known, and may be preferable when used at an industrial scale, but the inventor has found the spring technique is convenient and sufficient at least for development.

Another method for manufacture is worth consideration. It includes the steps of: taking a length of pipe, placing a restriction at one end of the pipe, passing a flow of heated air through the pipe from the other end under a slight positive pressure capable of causing distension, and when the pipe is soft and able to be distorted, wrapping it around a former of a suitable diameter and then continuing to pass now cooled gas through the pipe also under a slight distending pressure (capable of preventing loss of patency of the lumen) until the pipe is no longer soft. This method allows multiple flexible traps to be made in one operation and avoids the use of internal packing (the spring or coil of wire). It is limited by a probably inevitable temperature gradient along a long, multi-trap pipe although that can be reduced with a higher flow rate. The exit gas can be reheated and recirculated.

Preferably the former has raised sides about grooves, also tending to prevent widening with flattening of the softened pipe.

INSTALLATION

A trap according to the invention (see FIG. 1) may be held in stock until required. Note that when the free ends are held horizontally, in a preferred version one end is higher than the other. This optional feature is intended to provide for a higher water level without overflow within the inlet side of the trap—reflecting a negative pressure. At the time of installation the "higher" end of the trap (in relation to the turn of the coil) is fitted over an outlet from a drain tray of a condensate pan or drainage tray, and may be fastened in place with for example a screw-adjustable hose clamp of the type used on automobile radiator hoses. The lower end is fitted over a pipe leading to a drain and should be similarly fastened in place. The flexibility of the plastics material used in the invention permits (a) some bending movements during installation, in case both tray and drain are already fixed, and (b) allows considerable tolerance in fitting the trap in case of misalignment. If the connector is to be used as a trap it should be placed so that its one-turn coil lies substantially in a vertical plane. Once the trap is in place, it should be primed by the addition of some water so that the lumen of the trap is occluded in terms of the passage of air, even given a working partial vacuum on the condensate tray side.

OPERATION

During operation the trap may be checked from time to time by a service person for the presence of some water, and water may be added if required. The existence of a blockage within or after the trap, preventing water flow, will be clearly evident. In general such installations are kept in the dark and hence growth of algae within the pipe is not expected to be a problem.

While it is possible for a blockage to be visualised and broken up from the exterior, the principal advantage of flexibility in the event of blockage is that it is easy to remove the trap, clear it, and replace it without shifting other parts of an installation.

USE OF THE FLEXIBLE TRAP AS A FLEXIBLE COUPLER

The flexible trap, having a reasonably constant curvature along its length, is also a optimised shape for use as a vibration-isolating pipe or coupling. Some air conditioning units may exhibit vibration or oscillation from time to time, particularly where large fans are used. Some localities experience a number of earthquakes. Some applications are on board vehicles or ships. If there is likely to be relative movement between the air conditioner drip tray and the fixed drain pipes (or in other applications, between any pipes to be connected exhibiting relative mobility between one and the other), a flexible coupling such as the invention has the advantage over rigid pipes of not easily cracking or breaking and so causing an unsuspected leak, while the preformed "alpha shape" maintains a compact volume and allows the coupling to also serve as a trap if required.

VARIATIONS

Other plastics materials may be preferred. For example, there may be situations where clear PVC happens to be permeable to materials used in the vicinity, or intended use at elevated temperatures may soften the PVC too much. Variants of PVC having different types and levels of plasticisers may be employed. Cheaper, more easily formed, or more durable transparent flexible materials which exist, or may become commercially available during the term of this patent, may be substituted.

An internal one-way mechanical valve may be fitted as further security against the drawing back of unwholesome vapours from a drain to the the air conditioned space. This may be more desirable in hot, dry (desert) climates in which little if any condensate is formed within an air conditioning installation and when condensed water, normally relied on to serve as a valve, may not be present. FIG. 4 shows a cross-section 400 of a trap according to the invention adapted for hot dry conditions, including a simple flap valve 401, having a flap 402 and a seat 403.

COMMERCIAL BENEFITS OR ADVANTAGES

The trap comprises a single piece—rather than many, glued-together plastics units as in previous commercial practice, and hence reduces the cost, and the risk of failure. Smooth bends minimise the risk of blockages.

Flexibility reduces the risk of structural failure including cracks and resulting leaks. The flexible material allows connection to be made to quite widely misaligned pipes. The optimised shape (a continuous curve in a single direction) of the flexible trap allows it to carry fluid away from a vibrating source with minimised risk of development of localised strain and resulting damage.

It is an advantage (at least in terms of stock) for the same item to serve as both a flexible trap and as a flexible connector.

Dirt, blockages, and the like can be diagnosed quickly through the transparent walls, and may be manipulated and flushed out.

The flexible trap is easily removed for cleaning and can then be easily re-fitted.

Finally, it will be understood that the scope of this invention as described and/or illustrated within this provisional specification is not limited to the preferred embodiments described herein for illustrative purposes. Those skilled in the art will appreciate that various modifications, additions, and substitutions are possible without departing from the scope and spirit of the invention as set forth in the following claims.

What is claimed is:

1. A flexible trap or coupling for connection between a conduit capable of delivering a liquid and a conduit capable of disposing of the liquid, characterised in that the trap comprises a hollow, flexible, elongate member in the form of an open loop having a substantially constant rate of bending so having a configuration resembling the Greek "alpha" (α) symbol; the flexible trap having an inlet at a first free end continuous with a first limb, the first limb being continuous first with an intermediate part and then a second limb, in turn continuous with an outlet at a second free end; the flexible trap being capable, when used in an orientation wherein the inlet and the outlet are at a similar height and the intermediate part is below the inlet and below the outlet, of retaining a sufficient amount of the liquid within at least the intermediate part to allow operation as a plumbing trap by holding and allowing the passage of the liquid yet being capable of blocking the passage of a gas, the trap is made of a flexible material which is tubular and is selected from a range of flexible thermoplastic plastics materials including polyvinyl chloride; and the flexible material is effectively transparent yet coloured with an effective amount of a dye capable of absorbing light used by plant life, so that the growth of said plant life is discouraged.

2. The flexible trap as claimed in claim 1, characterised in that the flexible material is effectively transparent so that the contents of the trap may be inspected from the exterior.

3. The flexible trap as claimed in claim 1, characterised in that the flexible material is capable of being installed in a permanently distorted configuration so that connections may be made between misaligned pipes.

4. The flexible trap as claimed in claim 1, characterised in that a mechanical one-way valve is included within the flexible trap so that the trap function is retained even if insufficient liquid is present within the trap.

5. A flexible coupling, comprising the flexible trap as claimed in claim 1, for use in bridging a gap between a first conduit and a second conduit in situations where one conduit is capable of exhibiting motion in relation to the other, characterised in that both (a) the flexible material comprising the flexible coupling, and (b) the "alpha" ($\alpha$) configuration which has the effect of distributing the strain over the entire loop serve to maintain the integrity of the coupling despite relative movement.

6. A method for the manufacture of preformed traps of a flexible hollow elongated material as claimed in claim 1, including the steps of: taking a suitable length of pipe, fitting a coil of wire within the pipe, softening the pipe using heat, placing the pipe in a jig in an over-bent shape to allow for some springing back, optionally returning it to the oven, cooling the pipe while holding the pipe in the jig, and removing the coil of wire by twisting one end so that the coil diameter is reduced and the coil can be withdrawn.

7. A method for the manufacture of preformed traps of a flexible hollow elongated material as claimed in claim 1, including the steps of: taking a length of pipe, placing a restriction at one end of the pipe, passing a flow of heated air through the pipe from the other end under a slight positive pressure capable of causing distension, and when the pipe is soft and able to be distorted, wrapping the pipe around a former of a suitable diameter and then continuing to pass now cooled gas through the pipe under a slight distending pressure until the pipe is no longer soft.

8. A flexible trap or coupling for connection between a conduit capable of delivering a liquid and a conduit capable of disposing of the liquid; the flexible trap comprising a tubular, flexible, elongate member in the form of an open loop having an inlet at a first free end, an intermediate loop, and an outlet at a second free end; the flexible trap being capable when in use and when the intermediate part is lower than the inlet and lower than the outlet of retaining a sufficient amount of the liquid within at least the intermediate part to be capable of functioning as a plumbing trap preventing the passage of a gas between the conduits, characterised in that the trap is made of a flexible material which is transparent and is coloured with an effective amount of a colouring agent capable of absorbing light of colours within the range of colours used by plant life, so that the growth of said plant life within the trap is discouraged yet permitting inspection for the presence of liquid within the trap from the exterior.

9. The flexible trap as claimed in claim 8, characterised in that the colouring agent is capable of blocking the passage through the flexible material of a substantial proportion of light in a range including blue and green colours.

* * * * *